(12) United States Patent
Scholl

(10) Patent No.: US 8,240,646 B2
(45) Date of Patent: Aug. 14, 2012

(54) DAMPING SYSTEM

(75) Inventor: Joseph Scholl, Tholey (DE)

(73) Assignee: Hydac System GmbH, Sulzbach/Saar (DE)

( * ) Notice: Subject to any disclaimer, the term of this patent is extended or adjusted under 35 U.S.C. 154(b) by 1099 days.

(21) Appl. No.: 11/898,935

(22) Filed: Sep. 17, 2007

(65) Prior Publication Data

US 2009/0045022 A1    Feb. 19, 2009

(30) Foreign Application Priority Data

Aug. 17, 2007 (DE) .......................... 10 2007 038 933

(51) Int. Cl.
*B60G 11/18* (2006.01)

(52) U.S. Cl. ...................................................... 267/274

(58) Field of Classification Search .................. 267/274; 280/124.16, 5.514, 124.157, 6.15, 6.157, 280/124.158, 124.159, 124.161

See application file for complete search history.

(56) References Cited

U.S. PATENT DOCUMENTS

| | | | |
|---|---|---|---|
| 6,619,728 B1 * | 9/2003 | Kummel | 296/190.07 |
| 7,059,127 B2 * | 6/2006 | Bauer et al. | 60/469 |
| 7,497,452 B2 * | 3/2009 | Schedgick | 280/124.158 |

* cited by examiner

*Primary Examiner* — Melanie Torres Williams

(74) *Attorney, Agent, or Firm* — Roylance, Abrams, Berdo & Goodman, L.L.P.

(57) ABSTRACT

A damping system, in particular in the form of a hydraulic cabin spring system, has at least one hydraulically triggerable actuating part (20) and has at least one hydraulic accumulator (26) connected to the actuating part (20). By a proportional throttle valve (10), proportional damping for the actuating part (20) is achieved. Variable proportional damping which can react to events in a manner specific to the user can be implemented.

26 Claims, 3 Drawing Sheets

DAMPING SYSTEM

FIELD OF THE INVENTION

The present invention relates to a damping system, in particular in the form of a hydraulic cabin spring. The system has at least one hydraulically triggerable actuating part and at least one hydraulic accumulator connected to the actuating part.

BACKGROUND OF THE INVENTION

Damping or spring systems are readily available in the market in a plurality of embodiments. In addition to a cabin spring system for vehicles, other hydraulically triggerable actuating parts can be designed with damping, such as, for example, hydraulic motors for drive units. In the known solutions, to obtain uniform or constant damping, high control effort is necessary to detect the hydraulic state of the respectively triggerable actuating part and/or its position using correspondingly designed sensors.

SUMMARY OF THE INVENTION

An object of the present invention is to provide a simplified damping system allowing variable adjustment of constant damping ratios with few insert parts and components.

This object is basically achieved by a damping system where proportional damping for the respective actuating part of the damping system is achieved by a proportional throttle valve providing the only fluid communication between the actuating part and an accumulator. Variable proportional damping can be accomplished, compared to current solutions with constant damping, having the advantage of being able to react to events depending on the situation and in a manner specific to the user. By using the proportional throttle valve, it is possible to variably choke the respectively hydraulically triggerable actuating part with only one triggering process without hysteresis phenomena occurring in the actual damping process. This arrangement could adversely affect triggering precision. Compared to known solutions, the damping system according to the present invention also requires less control effort and only little space. The damping system solution according to the present invention can also be economically implemented and reliably operated.

In one especially preferred embodiment of the damping system according to the present invention, the proportional throttle valve interworks with nonreturn valves and, via the nonreturn valves, the trigger side of the actuating part not being damped can accept oil from the hydraulic accumulator, counteracting the danger of cavitation in the hydraulic circuit, as otherwise often occurs in the prior art damping systems. In an especially advantageous manner, cavitation is avoided where the proportional throttle valve with the nonreturn valves forms a type of hydraulic rectifier circuit.

The damping system according to the present invention can be used in particular for the hydraulic cabin spring system of a work vehicle, such as construction machinery or the like, in which the triggerable actuating part is formed from a hydraulic power or cushioning cylinder. The ratio of the opening cross sections of the proportional valve can then be made uniform depending on the area ratios of the power cylinder (piston to ring area) over the entire valve stroke. The ratio of the opening cross sections is equal to the area ratio of the piston area to the ring area. Consequently, for the same valve position, the deflection and rebound motion is uniformly damped, since the volumetric flow changes uniformly depending on the cylinder areas.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
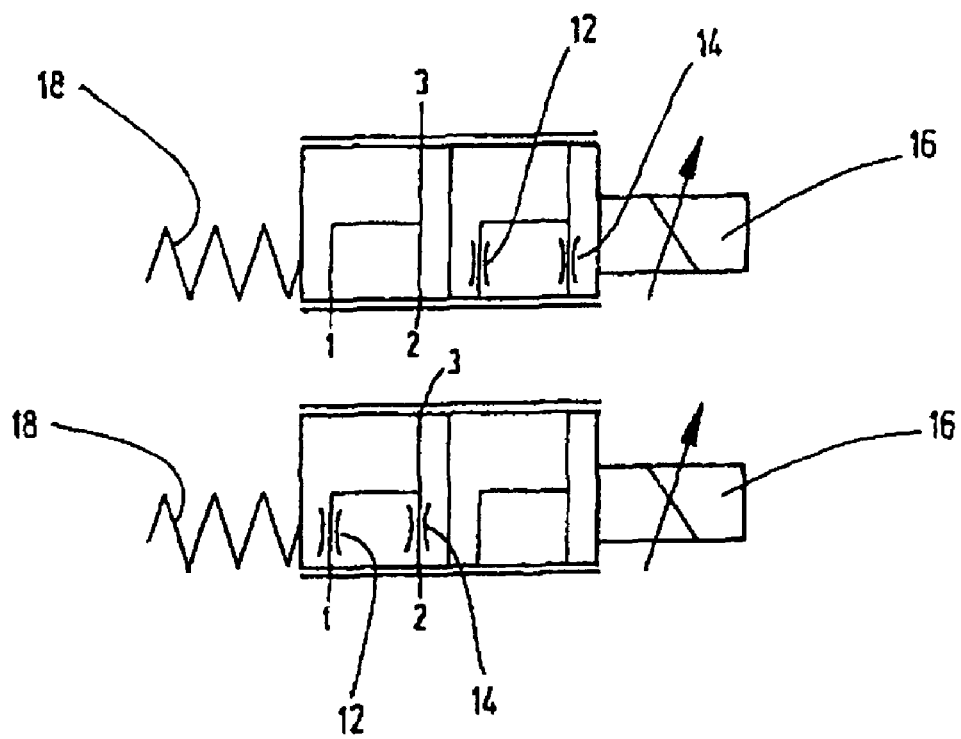
FIG. 1 is a hydraulic operating and circuit diagram of the basic structure of a proportional throttle valve in use in the unactuated and actuated positions according to an exemplary embodiment of the present invention.

FIG. 1 shows a proportional throttle valve 10 interconnecting the ports 1, 2 and 3 to carry fluid. The two integrated chokes 12, 14, depending on the application, can have the same free opening cross section, but also can have different cross sections. The proportional throttle valve 10 is completely closed in the base position (de-energized) or has a definable initial throttling cross section. Proportionally to the adjustment path, proportional throttle valve 10 clears a visibly increasing fluid cross section. The possibility also exists for the valve 10 in the base position (de-energized) to be completely opened and then to be proportionally closed over the adjustment path. To trigger the proportional throttle valve 10, an electromagnetic actuator 16 is used. The proportional throttle valve 10 can be returned into its initial position shown in FIG. 1 via a reset spring 18. The representation of the proportional throttle valve 10 shown in FIG. 1 is modified in FIGS. 2 to 4 in that only the chokes 12, 14 are shown to emphasize the proportional adjustment nature of the valve 10 in this way.

Figure 2:
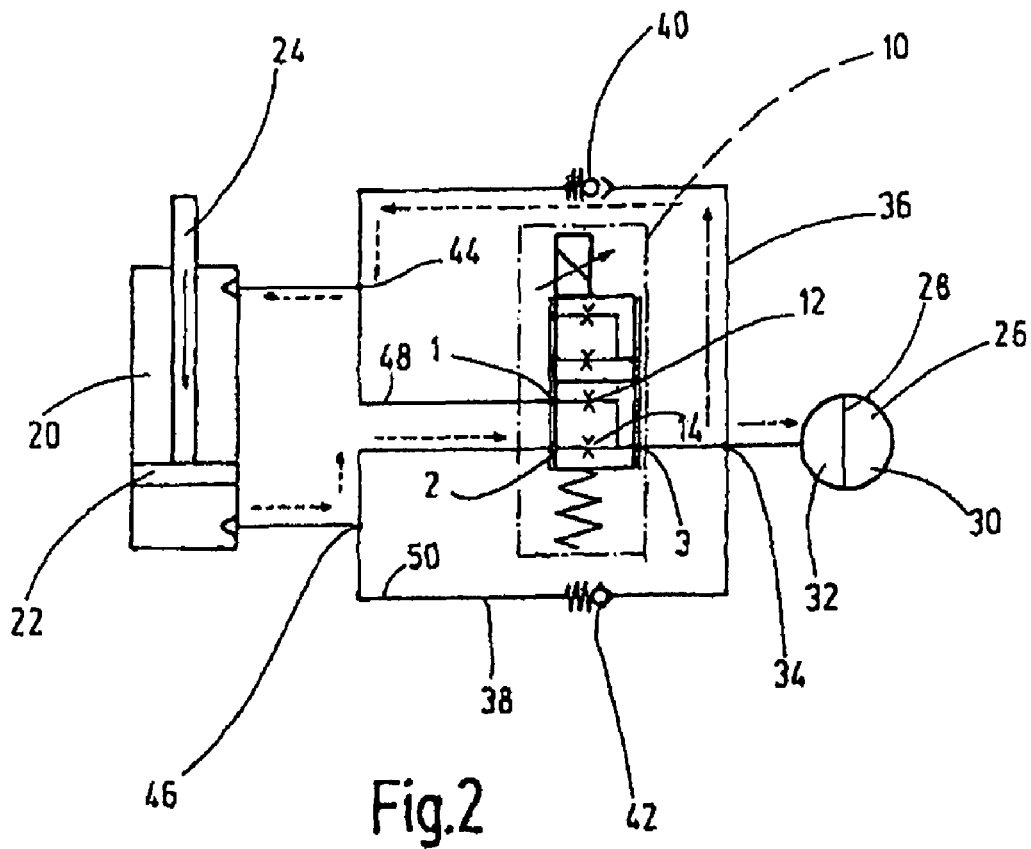
FIGS. 2 and 3 are hydraulic operating and circuit diagrams of the deflection and rebound process in a hydraulic power cylinder used for a cabin spring system according to a first exemplary embodiment of the present invention.

FIG. 2 shows the basic circuit of the damping system according to the present invention. In particular, the damping system is in the form of a hydraulic cabin spring system. Since these spring systems are conventionally known, only those parts in the present invention that differ from the prior art will be detailed here. The cabin or other vehicle structure is coupled to a hydraulically triggerable actuating part 20 in the form of a hydraulic power cylinder with a piston part 22 and a rod part 24. This actuating part in the form of a power cylinder is generally dynamically connected to an individual wheel or wheel set (not shown) of a work vehicle. The hydraulic actuating part 20 in terms of its fundamental function need not be limited to hydraulic power or cushioning cylinders. Other hydraulic means can be used here with components which can be triggered in two opposite directions, such as, for example, hydraulic motors (not shown).

With the damping system according to the present invention, the "spring system" for a hydraulic motor in its work use could also be implemented. This system, for example, can play a part in elevator cars or for forklifts of any type. For the actuating part 20, a hydraulic accumulator 26 is preferably formed from a diaphragm accumulator which is conventional in this field. This hydraulic accumulator 26 has a separating diaphragm 28 which separates the gas side 30 of the accumulator from its fluid side 32. The hydraulic accumulator 26 can be pretensioned accordingly depending on the fluid pressure on its gas side 30 and then in this respect forms an energy storage device for stored hydraulic energy. The port 3 of the proportional throttle valve 10 is connected to the fluid side 32 of the hydraulic accumulator 26 such that fluid communication between the actuating part and the accumulator is only through the proportional throttle valve. Between the hydraulic accumulator 26 and the proportional throttle valve 10, a branch point 34 is formed into which fluid lines 36 and 38 discharge with spring-loaded nonreturn valves 40 and 42 assuming their blocking position in the direction to the fluid side 32 of the hydraulic accumulator 26. The fluid line 36 furthermore discharges to the rod side of the power cylinder 20 and the fluid line 38 discharges into the assigned piston space of the cylinder 20. Assigned fluid lines 48, 50 discharge into the ports 1 and 2 of the valve 10 via other branch sites 44 and 46.

FIG. 2 shows the fluid-carrying situation for deflection, i.e., in the direction of FIG. 2, the piston part 22 and rod part 24 move down according to the arrow representation for the actuating part 20. The further broken-line arrows depict the approximate fluid path or flow in the hydraulic circuit of the damping system. Hydraulic energy is delivered into the hydraulic accumulator 26, in which fluid is displaced to the fluid side 32 thereof. Furthermore, in the deflection process shown in FIG. 2, the upper nonreturn valve 40 is opened and the nonreturn valve 42 is closed. The fluid displaced from the piston space by the piston part 22 is then routed via the choke 14 of the valve 10 in the direction to the accumulator 26.

Figure 3:
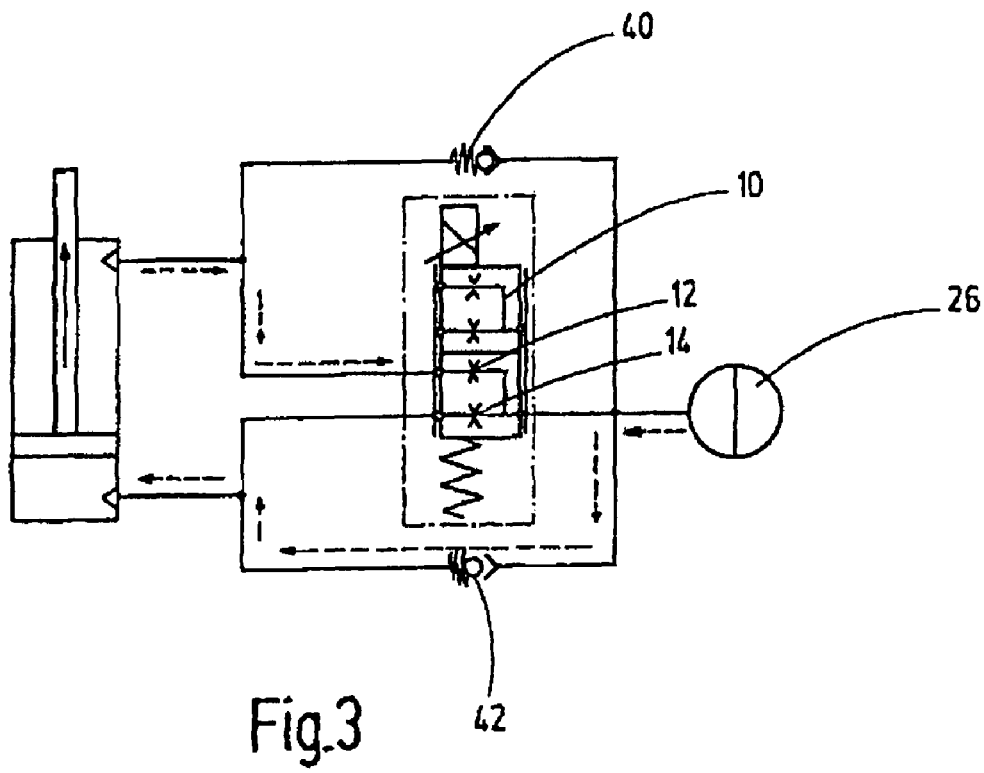

FIG. 3 in turn shows the rebound process in the opposite direction. The fluid displaced on the rod side travels or flows via the choke 12 into the afterflow circuit for the piston side of the cushioning cylinder 20 when the nonreturn valve 42 is opened and the nonreturn valve 40 is closed on the rod side. The fluid displaced from the cylinder 20 then takes the afterflow path to the piston side of the cylinder. This extension and rebound process of the piston part 22 and rod part 24 viewed in the direction of FIG. 3 is supported toward the top by the hydraulic accumulator 26.

The embodiment as illustrated in FIGS. 2 and 3 shows that the ratio of the opening cross sections of the chokes 12 and 14 of the proportional throttle valve 10 is uniform depending on the area ratio of the cylinder (piston area to ring area) for the actuating part 20 over the entire stroke of the valve 10. The ratio of the opening cross sections for the chokes 12, 14 accordingly is equal to the area ratio of the piston to the ring area from the piston part 22 to the rod part 24. Consequently, for the same valve position the deflection and rebound motion is uniformly damped, as shown, since the volumetric flow can change uniformly depending on the cylinder areas. Via the nonreturn valves 40, 42 the respective cylinder side (piston part 22 or rod part 24) which is not being damped can accept oil from the hydraulic accumulator 26, as a result of which the danger of cavitation in the circuit of the damping system is prevented.

Figure 4:
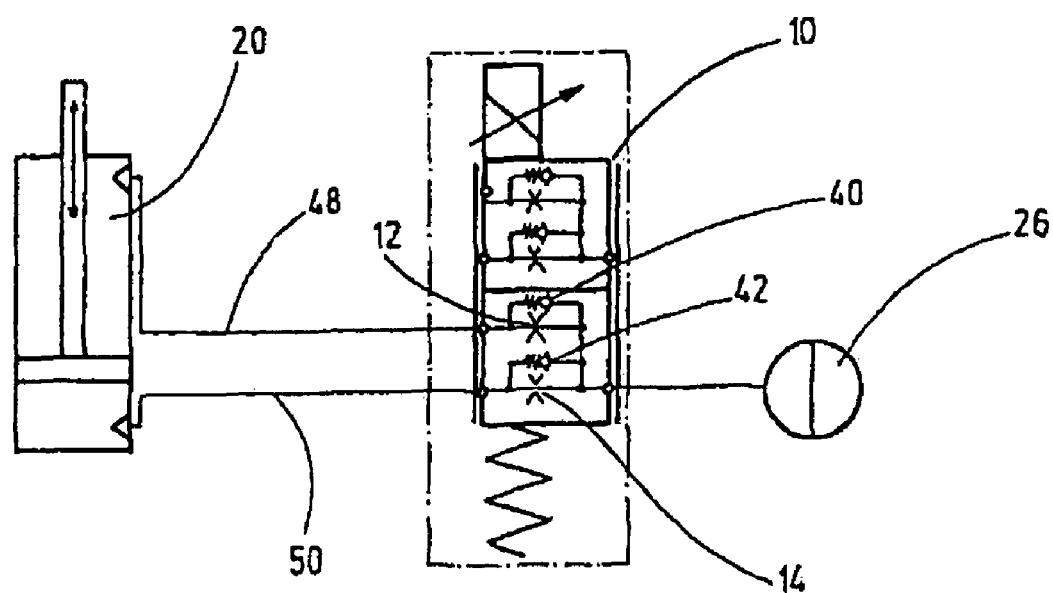
FIG. 4 is a hydraulic operating and circuit diagram of the hydraulic power cylinder used for the cabin spring system of FIGS. 2 and 3, but with nonreturn valves integrated in the housing of the proportional throttle valve according to a second exemplary embodiment of the present invention.

In the modified or second embodiment as shown in FIG. 4, the nonreturn valves 40, 42 are connected in a parallel configuration to the assignable chokes 14, 12. By using the respective integrated nonreturn valves 40, 42, additional fluid lines can be dispensed with and the proportional throttle valve 10 can be connected directly via the fluid lines 48, 50 to the rod side or piston side of the actuating part 20 in the form of the power cylinder.

Figure 5:
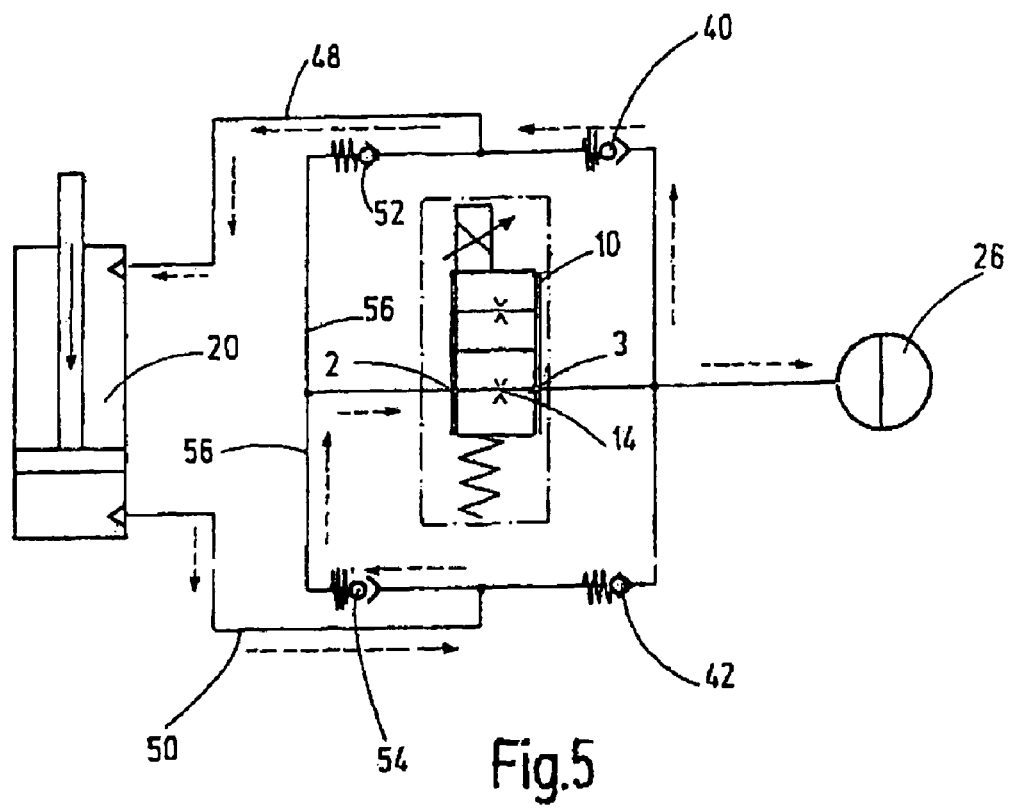
FIGS. 5 and 6 are hydraulic operating and circuit diagrams of the deflection and rebound process in a damping system according to a third exemplary embodiment of the present invention in a corresponding representation to the embodiment in FIGS. 2 and 3.
Figure 6:
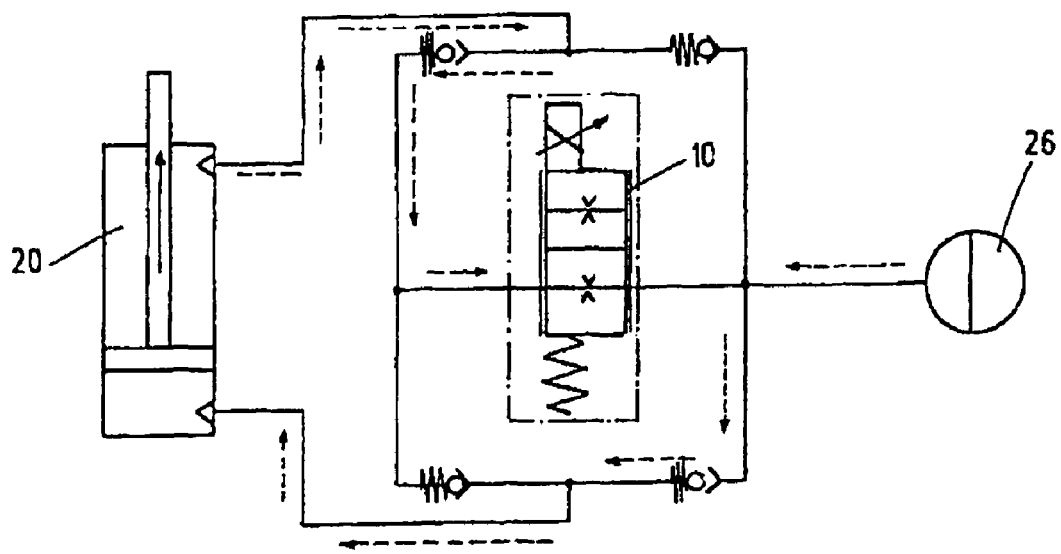

The modified or third embodiment shown in FIGS. 5 and 6 is explained only to the extent it differs significantly from the preceding embodiments. FIG. 5 shows a deflection process, comparable to FIG. 2. FIG. 6 shows a rebound process comparable to FIG. 3. The proportional throttle valve 10 includes only one choke 14. The parallel choke 12 located in the secondary branch is not necessary in the embodiment shown in FIGS. 5 and 6. Instead, two additional nonreturn valves 52 and 54 are used. The pairs of nonreturn vales 40, 42 and 52, 54 are interconnected in the manner of a hydraulic rectifier circuit together with the proportional throttle valve 10. The fluid lines 48 and 50 connected to the actuating part 20 each discharge between two adjacent nonreturn valves 42 and 54 and 40 and 52. In the opening direction the nonreturn valves 52 and 54 are placed on the connection side 2 of the valve 10 via the corresponding fluid lines 56. Conversely, the port 3 is connected in turn to the hydraulic accumulator 26 to carry fluid. The port 1 provided in the secondary branch shown in the embodiment in FIGS. 2 to 4 is omitted for this purpose.

For the deflection process as shown in FIG. 5, the nonreturn valves 40 and 54 located in different fluid branches are opened. The other nonreturn valves 42 and 52 are closed. In deflection, the required damping takes place via the choke 14. In the rebound process shown in FIG. 6, the nonreturn valves 42 and 52 are then opened while the nonreturn valves 40 and 52 are closed. Rebound takes place supported by the fluid discharge on the fluid side 32 of the hydraulic accumulator 26.

With the damping system according to the exemplary embodiment of the present invention shown in FIGS. 5 and 6, the oil to be damped is always routed through the proportional throttle valve 10. Via the respective nonreturn valves the power cylinder 20 can reroute oil without loss on the side which is not to be damped. Accordingly, only the pressure side is ever damped, regardless of the direction of motion on the actuating part 20. By the nonreturn valves the danger of cavitation on the respective draft side of the actuating part 20 is prevented. If in the embodiment shown in FIGS. 2 to 4 the same damping is to take place in both directions by the proportional throttle valve 10, the free opening cross section of choke 12 must be smaller than that of choke 14.

The damping system solution according to the present invention for a power cylinder (actuating part 20) manages with only one proportional throttle valve 10. This arrangement helps facilitate rapid and dedicated triggering. In particular the control effort can be greatly reduced. The damping system according to the present invention is also reliable in operation and requires little installation space. Due to the small number of components, an economical implementation is possible.

While various embodiments have been chosen to illustrate the invention, it will be understood by those skilled in the art that various changes and modifications can be made therein without departing from the scope of the invention as defined in the appended claims.

What is claimed is:

1. A damping system in a form of a cabin spring system, comprising:
   at least one hydraulically triggerable actuating part;
   at least one hydraulic accumulator;

a proportional throttle valve connected in fluid communication between and to said actuating part and said accumulator such that said actuating part and said accumulator are only connected in fluid communication through said proportional throttle valve;
an electromagnetic actuator coupled to said proportional throttle valve to trigger and move said proportional throttle valve from an initial position thereof; and
a reset spring coupled to said proportional throttle valve to return said proportional throttle valve to the initial position thereof.

2. A damping system according to claim 1 wherein nonreturn valves are connected in fluid communication with and operate with said proportional throttle valve.

3. A damping system according to claim 2 wherein said proportional throttle valve and said nonreturn valves form a hydraulic rectifier circuit.

4. A damping system according to claim 2 wherein said nonreturn valves are integrated into said proportional throttle valve.

5. A damping system according to claim 2 wherein at least one pair of said nonreturn valves is movable to closed positions in a direction of said accumulator.

6. A damping system according to claim 2 wherein at least two pairs of nonreturn valves are movable to closed positions in a direction of said accumulator.

7. A damping system according to claim 1 wherein said proportional throttle valve comprises two chokes.

8. A damping system according to claim 7 wherein said chokes have same opening cross-sectional areas.

9. A damping system according to claim 7 wherein said chokes have different opening cross-sectional areas.

10. A damping system according to claim 7 wherein said actuating part is a power cylinder having a piston side and a rod side with a piston cross-sectional area and a rod cross-sectional area, respectively; and
said chokes have opening cross-sectional areas defining a ratio proportional to a ratio of said piston cross-sectional area and said rod cross-sectional area.

11. A damping system according to claim 10 wherein said opening cross-sectional areas are formed by damping holes.

12. A damping system according to claim 7 wherein said chokes have opening cross-sectional areas formed by damping holes.

13. A damping system according to claim 1 wherein said actuating part is a power cylinder.

14. A damping system according to claim 13 wherein said power cylinder is a cushioning cylinder.

15. A damping system in a form of a cabin spring system, comprising:
at least one hydraulically triggerable actuating part being a power cylinder having a piston side and a rod side with a piston cross-sectional area and a rod cross-sectional area, respectively;
at least one hydraulic accumulator; and
a proportional throttle valve connected in fluid communication between and to said actuating part and said accumulator such that said actuating part and said accumulator are only connected in fluid communication through said proportional throttle valve, said proportional throttle valve having two chokes, said chokes having opening cross-sectional areas defining a ratio proportional to a ratio of said piston cross-sectional area and said rod cross-sectional area.

16. A damping system according to claim 15 wherein nonreturn valves are connected in fluid communication with and operate with said proportional throttle valve.

17. A damping system according to claim 16 wherein said proportional throttle valve and said nonreturn valves form a hydraulic rectifier circuit.

18. A damping system according to claim 16 wherein said nonreturn valves are integrated into said proportional throttle valve.

19. A damping system according to claim 16 wherein at least one pair of said nonreturn valves is movable to closed positions in a direction of said accumulator.

20. A damping system according to claim 16 wherein at least two pairs of nonreturn valves are movable to closed positions in a direction of said accumulator.

21. A damping system according to claim 15 wherein said chokes have same opening cross-sectional areas.

22. A damping system according to claim 15 wherein said chokes have different opening cross-sectional areas.

23. A damping system according to claim 15 wherein said opening cross-sectional areas are formed by damping holes.

24. A damping system according to claim 15 wherein said chokes have opening cross-sectional areas formed by damping holes.

25. A damping system according to claim 15 wherein said actuating part is a power cylinder.

26. A damping system according to claim 21 wherein said power cylinder is a cushioning cylinder.

\* \* \* \* \*